United States Patent [19]

Price

[11] Patent Number: 4,623,419

[45] Date of Patent: Nov. 18, 1986

[54] STEAM SACK VULCANIZING APPARATUS

[76] Inventor: John G. Price, 173 Tensaw Rd., Montgomery, Ala. 36117

[21] Appl. No.: 719,581

[22] Filed: Apr. 3, 1985

Related U.S. Application Data

[62] Division of Ser. No. 629,052, Jul. 9, 1984, abandoned.

[51] Int. Cl.$^4$ .................... B32B 31/20; B29C 17/00
[52] U.S. Cl. .................... 156/502; 100/211; 156/583.3; 425/389
[58] Field of Search .......... 156/583.3, 502, 157, 156/323, 304.6, 416; 425/405, 384, 389, 390, 417, 52, DIG. 19; 264/347, 314, 315; 100/211, 295

[56] References Cited

U.S. PATENT DOCUMENTS

| | | | |
|---|---|---|---|
| 1,806,861 | 5/1931 | Owen | 156/311 |
| 2,438,685 | 3/1948 | Stevens | 156/304.6 |
| 2,466,735 | 4/1949 | Piazze | 156/311 |
| 2,671,244 | 3/1954 | Freedlander | 156/140 |
| 2,698,273 | 12/1954 | Minen et al. | 156/583.3 |
| 3,487,871 | 1/1970 | Kanomori | 156/304.5 |
| 3,964,958 | 6/1976 | Johnston | 100/211 |
| 4,104,101 | 8/1978 | Carabedean | 264/109 |
| 4,243,368 | 1/1981 | Garabedian | 425/405 R |
| 4,334,850 | 6/1982 | Garabedian | 156/285 |
| 4,390,384 | 6/1983 | Tumen | 156/304.6 |

Primary Examiner—Michael Ball
Attorney, Agent, or Firm—Sherman & Shalloway

[57] ABSTRACT

Disclosed herein are method and apparatus for vulcanizing rubber. One example of an environment wherein the teachings of the present invention is quite useful is the environment of the creation of endless rubber belts by vulcanizing the ends of the belt together so as to make the belt endless. The apparatus disclosed herein basically consists of a pair of opposed thin sacks made of a flexible material which may, at the desired thickness thereof, comprise for example stainless steel. The ends of the belt are placed between these sacks and the sacks are supplied with steam at controlled temperature and pressure so as to provide the proper pressure as well as temperature for the vulcanizing process simultaneously. The method of operation of the apparatus basically consists of properly aligning the belt ends between the sacks, reciprocating the sacks toward one another until they snugly surround the belt ends, and controllably pressurizing and heating the belt ends to thereby vulcanize them together through the use of steam supplied within the sacks at a controlled temperature and pressure, followed by the cooling thereof.

9 Claims, 6 Drawing Figures

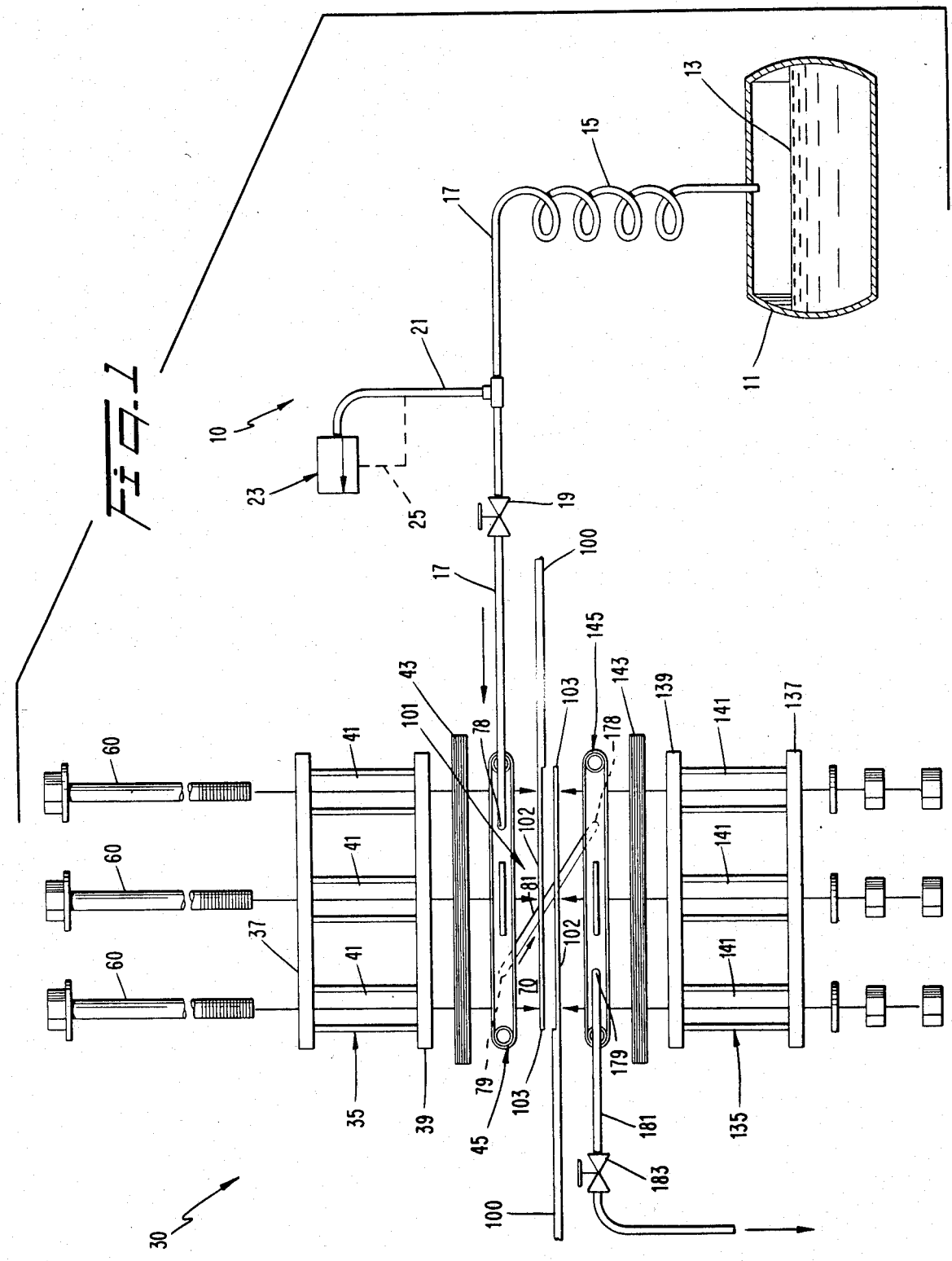

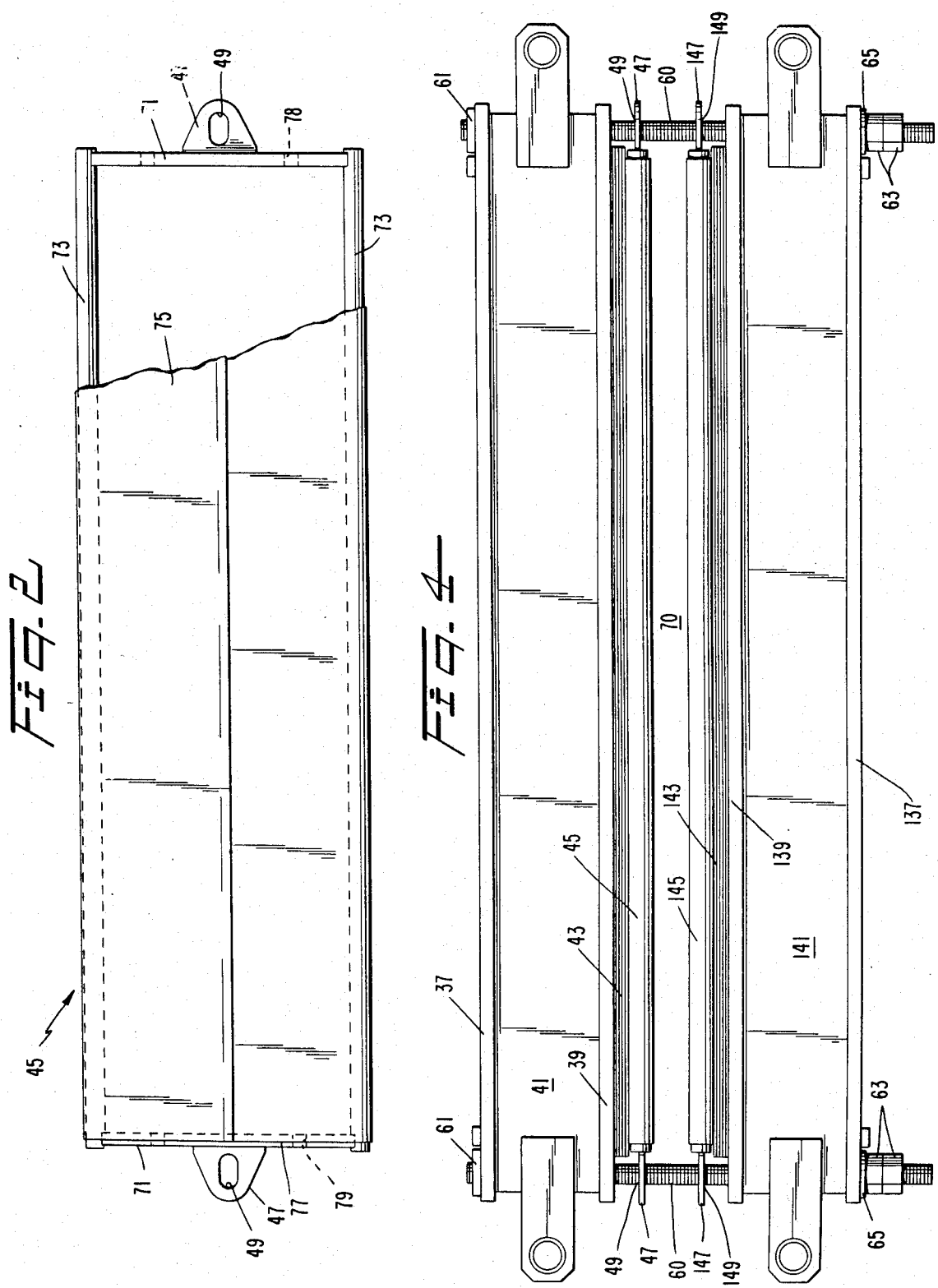

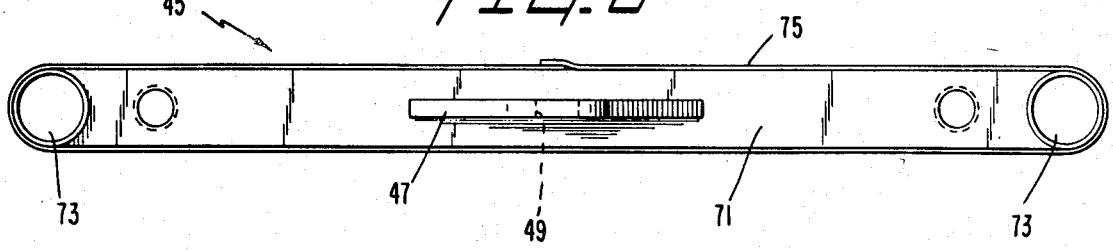
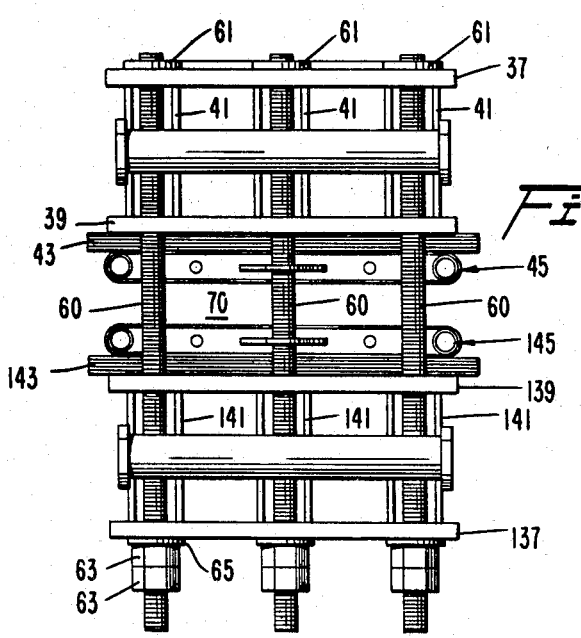
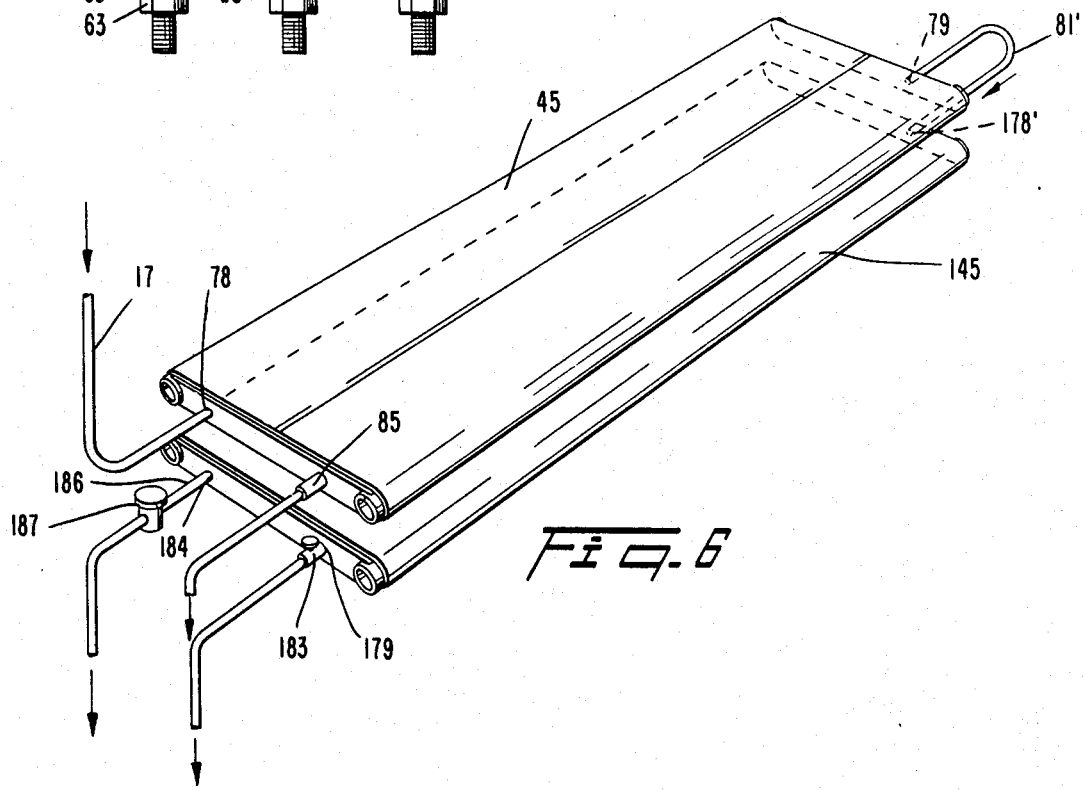

STEAM SACK VULCANIZING APPARATUS

This is a division of application Ser. No. 629,052, filed July 9, 1984, now U.S. Pat. No. 4,543,140.

BACKGROUND OF THE INVENTION

In order to join the two ends of a rubber belt together and in the process provide a strong joint therebetween, it is necessary to provide the proper heat and pressure simultaneously at the region of the joint which heat and pressure, when properly applied, act to vulcanize the rubber to thereby bond the belt ends together to form a joint. Often, in order to strengthen the joint, rubber cement is used as well as the addition of splice rubber so as to ensure that sufficient rubber is present at the region of the joint so as to provide a strong joint.

In the prior art, various methods have been utilized in order to provide heat as well as pressure at the area of the proposed joint. For example, screw jacks, hydraulic cylinders, air cylinders, etc. have been utilized in the prior art to provide the appropriate pressure for vulcanization. Further, in order to provide the proper temperature for vulcanization, electrical heating as well as steam heating have been used. Thus, in known systems, there has always been a problem with coordinating the source of pressurization with the source of heating so as to properly vulcanize the belt ends so as to form a proper joint. Some of the specific problems encountered through the use of the above described means for pressurizing and heating the region of the joint are as follows:

(a) It is desirable in pressurizing the location where the joint is to be produced to be able to uniformly pressurize the region at a pressure of between 60 and 125 psi. As noted above, one method for pressurizing the region of the splice comprises the use of screw clamps. In order to produce the required surface pressure at the area of the splice using screw clamping, it is necessary to tighten the bolt to a predetermined torque which requires expensive torque-measuring devices with the further expense incurred for paying the operator of such devices. In such an operation, a large number of screws may be necessary so as to properly pressurize the entire surface area, and accordingly, it is a time consuming operation to ensure that each bolt carries its correct load. During the time that the curing of the splice takes place, it is necessary to repeatedly check each bolt so as to ensure that no relaxation of the pressure has occurred. A further problem arises from the fact that the screws may only be placed along the outer edges of the belt, thus necessitating the use of transverse beams of great rigidity so as to evenly spread the pressure created by the torqueing-down of the screws across the surface of the splice. In order to provide sufficient rigidity in the beam so as to perform its required function, such a beam must be made quite heavy and accordingly such a beam is quite difficult to handle.

As noted hereinabove, a further means known in the prior art for clamping splices comprises the use of either hydraulic or air pressure clamping thereof. When such systems are properly used, even surface pressure applied to the belt surfaces at the region of the splice is possible, but in order to utilize this type of clamping procedure, a large variety of additional equipment is required such as pumps, compressors, hydraulic or air cylinders and the necessary hoses and other connections. In one form of air clamping, a pressurized rubber bag is used so as to evenly distribute clamping pressure over the entire surface of the splice area and so as to enable the absorption of any undulations in the surfaces thereof. The major drawback to the use of a rubber bag is that due to the fact that the region wherein the rubber bag is utilized is also heated to high temperatures, thus the lifespan of such a rubber bag is extremely limited. Further, replacing such a rubber bag is extremely expensive.

(b) As stated hereinabove, in order to vulcanize the area of the splice within a reasonable time, temperatures on the order of 300° to 360° Farenheit must be applied to the splice. The most commonly utilized source of heat in the splicing of rubber belts comprises radiation heating with electrical power. The main drawback to the use of electricity as a source of heat is that the site where the splicing is to take place must be within close proximity of a suitable power supply for the electricity or otherwise a large, expensive mobile electrical generator must be provided. In most instances, the use of extremely long extension cables are necessary which results in large losses in voltage which thereby lowers the temperatures which may be provided through an electrical source. Thus, the time period for vulcanization may be several times that which would be preferred.

As stated hereinabove, a further source of heat utilized in the vulcanization of rubber comprises the use of steam. The main limitation to the use of steam appears to be the requirement for a separate boiler arrangement so as to provide the steam.

(c) The zone where the splicing is taking place must be cooled in a manner so as to enable the vulcanization process to be concluded without causing blisters on the splice area. In the prior art, various methods have been employed for introducing cooling air or water into the zone wherein the splicing is taking place so as to cool the splice area. Such methods have commonly required complicated hose connections, and further equipment which has rendered the entire process extremely cumbersome and difficult to easily complete.

Applicant is aware of U.S. Pat. No. 4,334,850 to Garabedian which is related to prior U.S. Pat. Nos. 3,383,265, 4,104,101 and 4,243,368. U.S. Pat. No. 4,334,850 discloses an apparatus for making a stress-free plastic article which includes an embodiment shown in particular in FIG. 4 specifically designed for uniting together a series of layers of plastic with a micro-porous parting sheet and a wire screen. The device includes flexible sacks which are made in the same manner as the flexible envelope described with regard to the embodiment of FIG. 1. The envelope shown in FIG. 1 is disclosed as being produced in one form thereof of copper or stainless steel in thicknesses of 0.020 inches to 0.060 inches. The sacks shown in FIG. 4 are mounted on support members for relative movement toward and away from one another and heating cores are embedded in the support portions to supply heat to the fluid located within the sacks to thereby heat the materials which are being connected together between the sacks. Alternatively, this patent discloses the use of steam or hot liquids as the pressurizing fluid in order to heat the sack disclosed in the FIG. 1 embodiment thereof. While there are similarities between the teachings of U.S. Pat. No. 4,334,850 and the present invention, several differences also exist which are believed to render the present invention patentably distinct therefrom. A first difference lies in the fact that U.S. Pat. No. 4,334,850 is drawn to an apparatus which causes the consolidation of plastic particles into an article of manufacture. This is quite different from the purposes of applicant who vulcanizes belt splices together. The process of vulcanizing is a process which involves non-reversible molecular linking. This is quite different from the concept of merely melting particles together. A further difference involves the fact that U.S. Pat. No. 4,334,850 only contemplates pressures of 50 psi or less. Further, even though U.S. Pat. No. 4,334,850 discloses the use of steam to provide both heat and pressure to one embodiment thereof, no correlation is made in the patent between the concepts of the specific ranges of pressure and temperature which are necessary so as to vulcanize a splice of a rubber belt or other rubber article.

In developing the present invention, applicant listed several desirable criteria which he decided should be fulfilled in a self-contained belt vulcanizing device which criteria are included in the present invention. These criteria are:

(1) simplicity in design and assembly;
(2) the use of one source for both heat and pressurization of a splice;
(3) simplicity of operation; and
(4) cooling of the splice area should be accomplished without the use of any additional equipment.

SUMMARY OF THE INVENTION

The present invention overcomes the deficiencies in prior art vulcanizing devices and methods by providing an apparatus and method for vulcanizing rubber belt splices including the above described criteria and the following features:

(1) A pair of opposed steam sacks are provided, each of which is made of an extremely thin metal skin which metal may preferably be stainless steel. The thickness of the metal skin is on the order of 0.030 inches.

(2) Each steam sack is mounted on a frame device with the frame devices being reciprocable with respect to one another so as to enable adjustment of the spacing between the facing surfaces of the respective steam sacks. Thus, after the two ends of belt which are to be spliced together are placed between the steam sacks, the respective frames may be reciprocated so as to enable the engagement on opposite sides thereof by the opposed steam sacks.

(3) A boiler is provided in conjunction with the present invention which enables water to be boiled to create sufficient steam so as to pressurize the steam sacks to the desired pressure while heating them to the desired temperature simultaneously.

(4) A shut-off valve is provided in the system so that at the completion of the necessary vulcanizing time the pressurized steam may be retained within the steam sacks. The gradual cooling and condensation of the steam causes concurrent reduction in the pressure and temperature at the area of the splice to thereby allow the splice to come to a normal temperature and pressure while avoiding blistering at the region of the splice.

(5) The system includes means for adjusting the pressure of the steam within the steam sacks to thereby accordingly vary the temperature to which the belt splice is exposed which thereby controls the time of vulcanization. Accordingly, the system may be adjusted to accommodate to differing widths and thicknesses of belts as well as being adjustable to provide differing vulcanization times for belts of similar characteristics.

Accordingly, it is a first object of the present invention to provide a self-contained belt vulcanizing apparatus which is simple to operate while being simple in design and assembly.

It is a further object of the present invention to provide a self-contained belt vulcanizing device which enables the use of steam so as to provide both pressure and heat for the vulcanization process.

It is a yet further object of the present invention to provide a self-contained belt vulcanizing device which enables the cooling of the vulcanized area without the use of additional equipment and while avoiding blistering of the splice.

It is a still further object of the present invention to provide a self-contained belt vulcanizing device which enables a smooth transition between the original material and newly vulcanized material for esthetic purposes. It is a still further object of the present invention to provide a self-contained belt vulcanizing device which enables the operator thereof to vulcanize a spliced area of a rubber belt with great efficiency and economy.

These and other objects, aspects and features of the present invention will be better understood from the following specification when read in conjunction with the appended drawing figures.

BRIEF DESCRIPTION OF THE DRAWINGS

FIG. 1 shows an exploded view of the inventive belt vulcanizing device in conjunction with a schematic view of the means for supplying steam thereto.

FIG. 2 shows a top view of a steam sack in accordance with the present invention with portions thereof broken away to show detail.

FIG. 3 shows an end view of the steam sack shown in FIG. 2.

FIG. 4 shows a side view of the apparatus in accordance with the present invention.

FIG. 5 shows an end view of the apparatus in accordance with the present invention.

FIG. 6 shows a perspective view of the steam sacks in accordance with the present invention with the fluid connections thereto and therefrom shown schematically.

SPECIFIC DESCRIPTION OF THE PREFERRED EMBODIMENTS

With reference now to FIG. 1, the apparatus embodying the present invention is seen to include a steam supply system 10 and a vulcanizing apparatus 30 with the steam supply system 10 being shown in schematic form and the vulcanizing apparatus 30 being shown in an exploded view thereof.

The steam supply system includes a boiler 11 in which is contained a predetermined quantity of water 13. An outlet coil 15 is provided so as to enable steam created through heating of the water 13 by the boiler 11 to escape therefrom. The coil 15 connects with a conduit 17 which connects with an input port 131 formed on one of the inventive steam sacks as will be described hereinafter. A control valve 19 is provided in the steam line 17 so as to enable both the isolation of the boiler 11 from the vulcanizing apparatus 30 as well as the isolation of steam formed by the boiler 11 within the steam sacks of the vulcanizing apparatus 30 as will be described hereinafter. Also located on the line 17 is a tap-off line 21 which leads to a pressure regulating valve 23. A sensing line 25 also taps off of the line 21 and is connected to the pressure regulating valve 23. The specific details of the pressure regulating valve 23 do not form a part of the present invention. The purpose of the pressure regulating valve 23 is to ensure that the pressure in the steam supply line 17 does not exceed a predetermined desired pressure for steam to be located within the steam sacks. Accordingly, the pressure regulating valve 23 is designed so that it may be adjusted to "blow-off" when the pressure in the steam supply line 17 exceeds a predetermined set value. For example, the pressure regulating valve 23 may be set so that if the pressure in the steam line 17 exceeds 80 psi, the outlet port (not shown) of the pressure regulating valve 23 will open to thereby enable the venting of steam thereout to thereby reduce the pressure of steam in the steam supply line 17 to within the desired limits thereof. It may be desirable for the pressure regulating valve 23 to be designed in a similar manner to those pressure regulating valves disclosed in U.S. Pat. Nos. 203,580, 242,924, 569,670 and 3,079,945. In each of these patents, the pressure at which the relief outlet is opened is determined by the number of weights which are placed upon the valvehead thereof or upon associated structure. Accordingly, the steam supply system 10 includes a boiler 11 for creating the steam, a valve 19 enabling isolation of the boiler 11 from the vulcanizing apparatus 30 and a pressure regulating valve 23 which enables the close regulation of the pressure of steam in the steam supply line 17 downstream of the valve 19.

With further reference now to FIG. 1, it is seen that the vulcanizing apparatus 30 includes a first frame member 35 and a second frame member 135. Looking first at the frame member 35, it is seen that it comprises a top plate 37, a bottom plate 39 and three beams 41 extending between the plates 37 and 39 and forming therewith a rigid structure. On the underside of the plate 39 is mounted an insulation pad 42 which acts to separate the plate 39 from the steam sack 45 mounted therebelow.

As further seen in FIG. 1, the lower frame member 135 is comprised of a lower plate 137 and an upper plate 139. Between the plates 137 and 139 are located beam members 141 which define in conjunction with the plates 137 and 139 a rigid structure. Mounted above the plate member 139 is an insulation pad 143 which serves to separate the plate member 139 from the steam sack 145. With reference now to FIGS. 4 and 5, the assembly of the above described parts together to form the assembled vulcanizing apparatus 30 will now be described. As shown in FIGS. 4 and 5, the steam sack 45 has on opposed ends thereof a pair of ears 47 with each ear including a hole 49 therethrough. Similarly, at each end of the steam sack 145, an ear 147 is provided which has a hole 149 therethrough.

As may be seen in FIGS. 1 and 5, at each end of the respective frames 35 and 135, holes are provided in a manner so as to enable the insertion therethrough of corresponding bolts 60. Each bolt 60 includes a head 61 and at the end of each bolt opposite to the head 61, a pair of nuts 63 are provided along with a washer 65 so that the frame members 35 and 135 may be secured in surrounding relation about a splice area of a belt which is placed with the region 70. It is noted, with particular reference to FIGS. 4 and 5, that the bolts 60 which are located centrally of the ends of the frame members 35 and 135 are so dimensioned and oriented that they extend through the respective holes 49 and 149 of the ears 47 and 147 of the respective steam sacks 45 and 145. In this manner, the steam sacks 45 and 145 are positively aligned with one another and with respective frame members 35 and 135 so that accurate clamping of the steam sacks 45 and 145 about a splice area of a belt may be accomplished.

With reference now to FIGS. 2 and 3, the specific structural details of the steam sack 45 will be explained, with it being understood that the specific details of the steam sack 145 are substantially identical thereto. As shown in FIGS. 2 and 3, the steam sack 45 includes an open frame member made of opposed bar members 71 and opposed rod members 73 which have a substantially circular cross-section as best seen in FIG. 3. As best seen in FIG. 2, the bars 71 and rods 73 are assembled together to form a substantially rectangular frame assembly. A diaphragm-like thin, flexible covering 75 is mounted over the frame assembly as best seen in FIG. 3 and is welded at its ends 77 to the respective bar members 71 so that the chamber formed within the skin 75 is positively sealed. As shown in FIGS. 2 and 3, the ears 47 may, if desired, be substantially triangular in configuration with the holes 49 being slightly elongated to allow for slight lateral shifting of the steam sacks about the bolts 60 for alignment purposes. As shown in phantom in FIG. 2, one of the bars 71 includes a bore 78 therethrough which may be connected to a steam inlet fitting while a second one of the bars 71 includes a bore 79 which may be connected to a steam outlet fitting. Alternatively, if desired, the inlet and outlet may be located on the same bar 71.

With reference now to FIGS. 1 and 6, further details with regard to the supplying and exhausting of steam to and from the vulcanizing apparatus 30 will now be described. As shown in FIG. 1, and explained hereinabove, the steam supply line 17 supplies steam to an input port 78 on the steam sack 45. The steam sack 45 also includes a steam output 79 to which is connected a conduit 81 which conveys the steam from the output port 79 to an input port 178 on the steam sack 145. Alternatively, as shown in FIG. 6, the connecting line between the steam sack 45 and the steam sack 145 may be located such that the output port of the steam sack 45 is on the same side thereof as the input port for the steam sack 145. This configuration is shown in FIG. 6 which shows output port 79 on the steam sack 45 and input port 178' on the steam sack 145 with the connecting conduit being designated by reference numeral 81'. The steam sack 145 has an output port 179 which enables the steam to exit therefrom. To this output port 179 is connected a conduit 181 which leads to a blow-down area via a control valve 183. As best seen in FIG. 6, the steam sack 45 may include, if desired, a further relief valve 85 which protects the steam sack 45 against rupture and against the pressure therein increasing to a value greater than that which is desired. With further reference to FIG. 6, it is seen that a further output port 184 may be provided on the steam sack 145 and a conduit 186 may be connected thereto so as to enable the connection of a steam trap 187 to the steam sack 145 so as to allow condensate to be extracted and removed therefrom.

Now, with the apparatus in accordance with the present invention having being described, the operation thereof will now be explained. First, with reference to FIG. 1, it is seen that a belt 100 is formed with a splice area 101 comprising thin sections 102 immediately adjacent the ends 103 of the belt 100. As shown in FIG. 1, the belt 100 splice area 101 is placed within the region 70 between the steam sacks 45 and 145 with the thin areas 102 thereof aligned in stacked relationship with one another. If desired, rubber cement may be applied between the thin areas 102 so as to enhance the vulcanization thereof.

The following table relates the pressure of steam with its temperature at that pressure:

TABLE 1

| PRESSURE OF STEAM IN PSI | TEMPERATURE OF STEAM IN °F. |
|---|---|
| 60 | 307 |
| 70 | 316 |
| 80 | 324 |
| 90 | 331 |
| 100 | 338 |
| 110 | 344 |
| 125 | 352 |

As may be seen from Table 1, as the pressure of the steam increases, the temperature of the steam correspondingly increases and vice versa in a predictable relationship. As is known to those skilled in the art, as the pressure and temperature of the steam are increased, the vulcanization time is decreased for belts of equal configuration. It may be desirable to increase the temperature and pressure of the steam in situations where the belt is thicker than usual, or when it is desired to reduce the vulcanization time in belts of normal thickness, which is on the order of one-fourth to one-half inch thickness.

Now, in step by step fashion, the operation of the present invention will be described:

(1) The nuts 63 are loosened to as to enable the steam sacks 45 and 145 to be separated from one another a sufficient distance so as to enable the insertion therebetween in the region 70 of the ends 102 of the belt 100 which is to be spliced therein. After the ends of the belt 100 are suitably positioned within the region 70, the bolts 63 are tightened so as to firmly engage the steam sacks 45 and 145 on respective sides of the belt 100 at the area of the splice 101.

(2) The steam supply system 10 is activated by firing up the boiler 11 through means well known by those skilled in the art. The steam coil 15 has been provided as shown in FIG. 1 so as to enable the super heating of the steam formed through the boiling of the water 13. With the valve 19 in the closed position, the pressure regulating valve 23 is adjusted as is well known to those skilled in the art so that it opens when the pressure in the line 17 exceeds the desired operating pressure for the system 10. For example, if it is desired that the system operate at 100 psi of steam pressure, the pressure regulating valve 23 is set so that if the pressure in the line 17 exceeds 100 psi, the valve 23 will open enabling the blowing-off of the excess pressure therethrough.

(3) After the pressure regulating valve 23 has been set at the desired operating level, the valve 19 is opened to thereby enable steam to be supplied through the conduit 17 through the port 78 into the steam sack 45 where the steam pressurizes the steam sack 45 causing the diaphragm-like skin 75 thereof to press against the upper surfaces of the belt 100 in the area of the splice 101. The steam then progresses out the port 79 through the conduit 81 to the input port 178 of the steam sack 145 where the steam pressurizes the steam sack 145 and causes it to press upwardly on the underside of the splice area 101 of the belt 100.

(4) During the filling of the steam sacks 45 and 145 with steam, the outlet valve 183 remains in the closed position. After the steam sacks have been filled with steam and are pressurized at the desired pressure, the inlet valve 19 may be closed so as to isolate the steam within the steam sacks 45 and 145.

(5) The steam may be isolated within the steam sacks 45 and 145 through closing of the valves 19 and 183 at the beginning of the vulcanizing process or if desired, at the end of the vulcanizing process. If it is desired to isolate the steam within the steam sacks at the conclusion of the vulcanizing process, the gradual cooling of the steam will result in gradual cooling and reduction in pressure at the area 101 of the splice to thereby enable the splice to come to a normal room temperature and pressure without any blistering taking place.

(6) The operation of the present invention has been described hereinabove with reference to, in particular, FIG. 1. Again, as explained hereinabove, the connection between the steam sack 45 and the steam sack 145 may, if desired, be through the port 79, flexible hose 81' and port 178' as shown in FIG. 6. With further reference to FIG. 6, it is seen that further method steps involved in the operation of the apparatus in accordance with the present invention, may include the relieving of overpressures in the steam sack 45 by way of the relief valve 85, the removal of condensation from the steam sack 145 via the steam trap 187 as well as the blowing-down of steam removed from the steam sack 145 via the valve 183.

As stated hereinabove, the preferred material for the skin portions 75 and 175 of the respective steam sacks 45 and 145 is stainless steel at a thickness of approximately 0.030 inch. While this is the preferred configuration, it is noted that as long as the steam sack skins are sufficiently thin so as to be resilient and so as to enable the rapid transmission of the heat from the steam therethrough to the belt, any thickness and material fulfilling these criteria would be sufficient. It is noted that the preferred thickness for the skins 75 and 175 of the steam sacks is between 0.020 inches and 0.040 inches.

It is to be stressed that one of the main aspects of the present invention lies in the fact that steam is an ideal fluid for the heating and pressurizing of a splice in a rubber belt which is being vulcanized thereby. Again, this is because the ideal circumstances for the vulcanization of rubber are pressures between 60 and 125 psi and temperatures of between 300° and 350° F. In this regard, steam is unique because between 60 psi and 125 psi, its temperature ranges between 307° F. and 352° F. Accordingly, applicant has taken advantage of this fact to devise a system and method of operation thereof which ideally takes advantage of these characteristics of steam so as to efficiently vulcanize rubber belt splices.

It is further noted, that in order to make the present invention quite portable in nature, it is desirable that the boiler be fired with liquid propane gas and such boilers are well known in the art as capable of raising steam at 100 psi in approximately 5 minutes. One distinct advantage of the present invention lies in the fact that the operator is only required to have one tool, to wit, a wrench for dogging down the nuts 63 about the bolts 60. Further, as best seen with reference to FIG. 3, the edges of the steam sacks adjacent the rods 73 are rounded and this rounded configuration provides a smooth transition from the original belt material to the new vulcanized material without ridges or other undulations.

In order to further facilitate the portable nature of the vulcanizing apparatus 30, the frame members 35 and 135 may, if desired, be made of aluminum or other lightweight metals as desired. If desired, each frame member may be provided with handles (not shown) so as to facilitate the movement thereof from one jobsite to another. If desired, the insulating members 43 and 143 may be made of rubber, but, if desired, they may be made of any material which will tend to resist the migration of heat from the steam sacks to the respective frame members.

Preferably, as shown in the drawings, the steam is introduced into the upper steam sack with the steam sacks being connected in series so that gravity assists in the draining of condensate to the lowest outlet connection thereof which is located in the steam sack 145 and designated by the reference numeral 179 (FIGS. 1 and 6). If desired, however, the steam sacks may be connected in parallel to the steam supply line 70 with each steam sack having its own individual relief valve and steam trap and outlet.

The present invention has been described in relation to a preferred embodiment thereof. One of ordinary skill in the art, after reading the foregoing specification, may be able to affect various changes, substitutions of equivalence, modifications and other alterations without departing from the overall intent and scope of the inventive concepts disclosed herein. It is therefore intended that the invention described herein only be limited by the scope of the following claims.

I claim:

1. An apparatus for vulcanizing a rubber article at a splice area thereof comprising:
   (a) a pair of opposed frame members;
   (b) steam sack means mounted on each frame member each said steam sack means comprising a generally rectangular frame and a thin metallic skin mounted in surrounding relation about said frame;
   (c) means for releasably fastening said frame members together so as to retain said rubber article between said steam sack means; and
   (d) steam supply means for supplying steam to said steam sack means at a pressure of at least 60 psi whereby said steam applies both pressure and vulcanizing temperature to said rubber article.

2. The invention of claim 1, wherein said means for releasably fastening comprises a plurality of bolts extending through said frame members and nuts threaded onto said bolts.

3. The invention of claim 2, wherein each steam sack means includes laterally extending ears, each ear having a hole therethrough, and some of said bolts extend through said ear holes.

4. The invention of claim 1, wherein each steam sack means comprises:
   (a) a pair of opposed bars; and
   (b) a pair of opposed rods, said bars and rods forming said frame.

5. The invention of claim 4, wherein said skin is made of stainless steel.

6. The invention of claim 5, wherein said skin is 0.02 to 0.04 inches thick.

7. The invention of claim 5, wherein said skin is welded to said rods.

8. The invention of claim 1, wherein said steam supply means comprises:
   (a) boiler means;
   (b) steam conduit means extending from said boiler means;
   (c) superheater coil means mounted in said steam conduit means; and
   (d) pressure regulating valve means in said steam conduit means for regulating the pressure of steam therein.

9. The invention of claim 8, wherein said steam supply means further includes:
   (a) conduit means serially interconnecting said steam sack means, a first steam sack means being upstream of a second steam sack means;
   (b) first shutoff valve means upstream of said first steam sack means; and
   (c) second shutoff valve means downstream of said second steam sack means.

* * * * *

UNITED STATES PATENT AND TRADEMARK OFFICE
CERTIFICATE OF CORRECTION

PATENT NO. : 4,623,419

DATED : November 18, 1986

INVENTOR(S) : John G. Price

It is certified that error appears in the above-identified patent and that said Letters Patent is hereby corrected as shown below:

ON THE TITLE PAGE

[62] Related U.S. Application Data
      delete "abandoned"
      insert --now U.S. Patent 4,543,140--.

Signed and Sealed this

Tenth Day of February, 1987

*Attest:*

DONALD J. QUIGG

*Attesting Officer*      *Commissioner of Patents and Trademarks*